R. PRESTON.
SIDE LINER FOR TRUCK BOXES.
APPLICATION FILED FEB. 23, 1911.
1,089,669.
Patented Mar. 10, 1914.
2 SHEETS—SHEET 1.
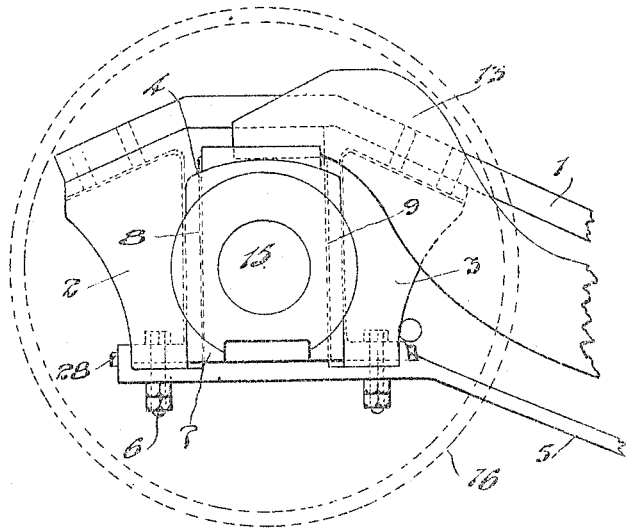
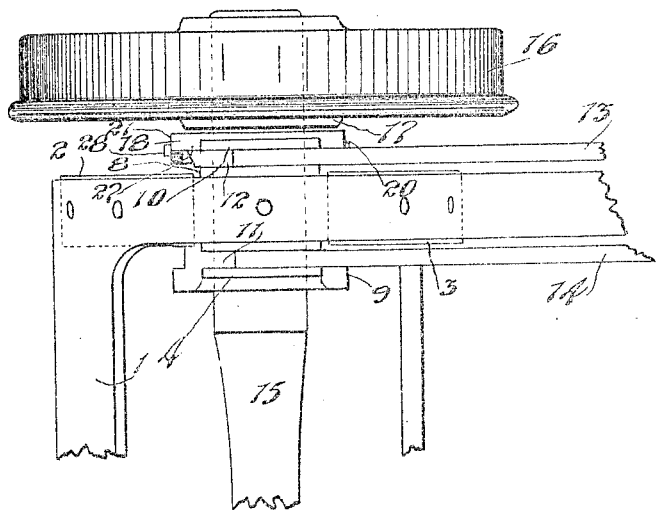
Witnesses
B. Foster
W. Wakefield
Inventor
R. Preston
By R. PRESTON.
SIDE LINER FOR TRUCK BOXES.
APPLICATION FILED FEB. 23, 1911.
1,089,669.
Patented Mar. 10, 1914.
2 SHEETS—SHEET 2.
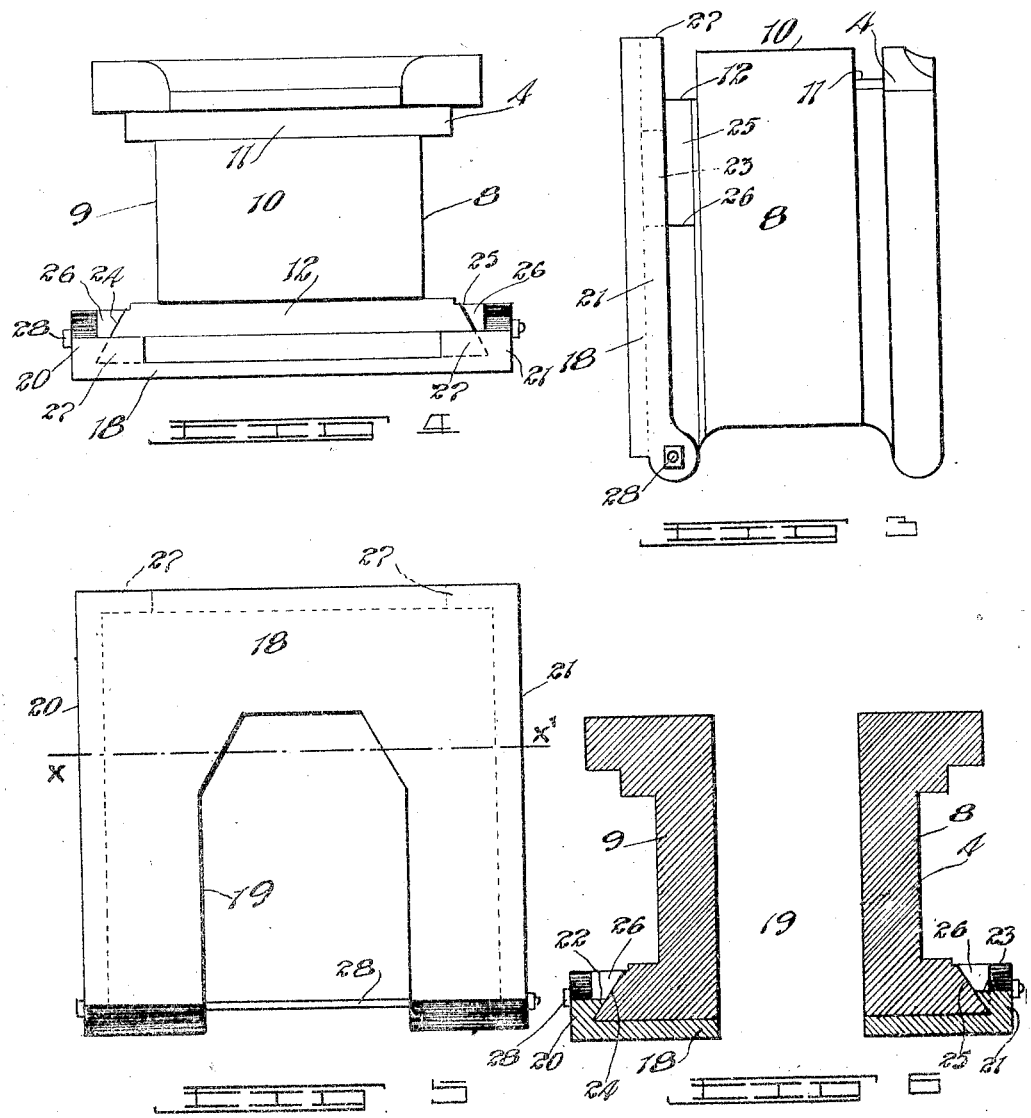

UNITED STATES PATENT OFFICE.

ROBERT PRESTON, OF WINNIPEG, MANITOBA, CANADA.

SIDE-LINER FOR TRUCK-BOXES.

1,089,669.

Specification of Letters Patent. Patented Mar. 10, 1914.

Application filed February 23, 1911. Serial No. 610,407.

*To all whom it may concern:*

Be it known that I, ROBERT PRESTON, of the city of Winnipeg, in the Province of Manitoba, Canada, have invented certain new and useful Improvements in Side-Liners for Truck-Boxes, of which the following is the specification.

My invention relates to a side liner for truck boxes particularly adapted to railway use, and the object of the invention is to provide a simply constructed, inexpensive, and efficient renewable side liner which can be easily applied on or removed from a truck box, thereby avoiding the necessity of constantly supplying new boxes for the truck owing to the face adjoining the wheel becoming worn to such an extent that the box has to be dispensed with entirely.

With the above and other objects in view which will become more apparent as the description proceeds, the invention consists essentially in the arrangement and construction of the parts hereinafter more particularly described and later pointed out in the appended claims.

Figure 1 is a side elevation of a portion of a truck with the truck box supplied with my invention. Fig. 2 is a plan view of the same. Fig. 3 is an enlarged detailed side elevation of a truck box with my liner applied. Fig. 4 is a plan view of the same. Fig. 5 is a front elevation. Fig. 6 is a horizontal sectional view through the box and liner, the section being taken in the plane denoted by the line X—X', Fig. 5.

In the drawings like characters of reference indicate corresponding parts in each figure.

1 represents a truck frame, which truck frame carries the pedestals 2 and 3 between which is inserted the truck box 4.

5 is a bottom brace secured by bolts 6 to the lower ends of the pedestals and supporting the cellar box 7 as well as the truck box. The truck box is in the form of an open sided rectangle having vertically directed sides 8 and 9, and a top 10, the open bottom admitting of the cellar box which carries the usual oil and waste. The top of the truck box is recessed at 11 and 12 to receive the equalizer bars 13 and 14 and the sides are shaped to conform to and receive the pedestals so that the box is prevented from side-play.

15 is the truck axle which is carried within the box and is provided with truck wheels 16 having the sides adjoining the boxes faced as at 17.

The parts above described are of ordinary construction and form no part of my invention. I have not described them in detail as they will be readily understood by one familiar with truck construction.

In actual practice it is found that the truck box becomes worn to such an extent owing to the face 17 of the wheel 16 continually rubbing against it, that it has to be renewed. This is quite an expensive operation, as it takes considerable time, and in order to avoid the continual loss of truck boxings in this way and the expense incurred in replacing them, I have devised the liner as now described, which liner comprises in reality a bronze plate which is inserted between the face 17 of the wheel and the adjoining face of the truck box. The plate is worn by the continual rubbing of the wheel but the box is preserved.

18 represents the plate or liner which is constructed to fit the face of the box adjoining the wheel, and has the central portion thereof cut away as at 19 to span the axle 15. The sides of the plate are fitted with flanges or turned back edges 20 and 21, and the flanges are supplied with wedge-shaped projections 22 and 23, which bear against the sides of the truck box, the sides being inclined or beveled at 24 and 25 to receive them slidably. Shoulders 26 are formed on the box, which shoulders abut the lower ends of the wedge-shaped projections, thereby preventing the plate from passing downwardly too far when it is applied on the truck box. Stop pieces 27 are formed on the upper edge of the plate, which stop pieces engage with the top of the box and limit its downward movement. The flanges 20 and 21 are enlarged at the bottom and are fitted with openings which receive a cross pin 28 termed a cellar pin, which passes through the base of the truck box and also through the cellar box. It is to be understood that this pin is at present employed for holding the cellar box in the truck box, and in the present instance I utilize it for holding the plate or liner against upward displacement. With my invention applied to a truck, it will be seen that as soon as the liner becomes badly worn, it is only necessary to remove the cellar pin and slide the liner upwardly until it is completely free of the box when it can be removed and a new one inserted in its place.

The side liner or plate just described is especially adapted for engine truck boxes and driving wheel boxes of locomotives. A box of this kind has been shown in the drawings.

What I claim as my invention is:

1. The combination with a box having similar shoulders formed on the opposite sides thereof and the faces of the box above the shoulders beveled, of a plate fitting the face of the box and provided with back-turned flanges fitting against the edges of the box, said flanges being supplied with wedge shaped projections bearing normally slidably against the beveled faces aforesaid of the box and engaging with the shoulders, stops carried by the plate and engageable with the top of the box and a releasable pin passing through the lower ends of the flanges and securing the plate to the box, as and for the purpose specified.

2. The combination with a journal-box, wheel and axle, of a wear plate interposed between the wheel-hub and adjacent end of the journal-box, said wear plate having inturned flanges embracing the journal-box, guide-connections between said flanges and the lateral surfaces of the outer end portion of the journal-box, and means connecting said flanges and the journal-box beneath the axle to secure the wear-plate against accidental dislodgment.

Signed at Winnipeg, in the Province of Manitoba, this 19th day of December, 1910.

ROBERT PRESTON.

In the presence of—
G. S. ROXBURGH,
J. K. ELKIN.